(12) United States Patent  
Testud et al.

(10) Patent No.: US 7,158,071 B2  
(45) Date of Patent: Jan. 2, 2007

(54) RADAR RAINFALL ESTIMATION TECHNIQUE WHEN ATTENUATION IS NEGLIGIBLE

(75) Inventors: Jacques Testud, Paris (FR); Erwan Le Bouar, Paris (FR)

(73) Assignee: Centre National de la Recherche Scientifique (CNRS), Paris (FR)

( * ) Notice: Subject to any disclaimer, the term of this patent is extended or adjusted under 35 U.S.C. 154(b) by 49 days.

(21) Appl. No.: 10/483,188

(22) PCT Filed: Jul. 11, 2002

(86) PCT No.: PCT/FR02/02447

§ 371 (c)(1),  
(2), (4) Date: Jun. 1, 2004

(87) PCT Pub. No.: WO03/007016

PCT Pub. Date: Jan. 23, 2003

(65) Prior Publication Data

US 2004/0201515 A1    Oct. 14, 2004

(30) Foreign Application Priority Data

Jul. 11, 2001    (FR) .................................. 01 09206

(51) Int. Cl.  
*G01S 13/95* (2006.01)

(52) U.S. Cl. .................. 342/25 R; 342/188; 342/26 D

(58) Field of Classification Search .............. 342/26 R, 342/26 A, 26 B, 26 C, 26 D, 188, 460  
See application file for complete search history.

(56) References Cited

U.S. PATENT DOCUMENTS

| | | | |
|---|---|---|---|
| 4,649,388 A * | 3/1987 | Atlas ........................ 342/26 D |
| 5,500,646 A * | 3/1996 | Zmic ........................ 342/188 |
| 6,061,013 A | 5/2000 | Sauvageot et al. |
| 6,069,565 A * | 5/2000 | Stern et al. ................. 340/583 |
| 6,456,226 B1* | 9/2002 | Zheng et al. ............. 342/26 R |
| 6,473,026 B1 | 10/2002 | Ali-Mehenni et al. |
| 2004/0056791 A1* | 3/2004 | Alford et al. ................. 342/26 |
| 2004/0201515 A1* | 10/2004 | Testud et al. ............. 342/26 R |

FOREIGN PATENT DOCUMENTS

| | | |
|---|---|---|
| WO | WO 85/02266 | 5/1985 |
| WO | WO 97/24629 | 7/1997 |

(Continued)

OTHER PUBLICATIONS

"Polarimetric radar signatures of precipitation at S- and C-bands", Bringi, V.N.; Chandrasekar, V.; Meischner, P.; Hubbert, J.; Golestani, Y Radar and Signal Processing, IEE Proceedings vol. 138, Issue 2, Apr. 1991 pp. 109-119.*

(Continued)

*Primary Examiner*—John B. Sotomayor  
(74) *Attorney, Agent, or Firm*—Jacobson Holman PLLC

(57) ABSTRACT

A method of using a bipolar radar to estimate a precipitation rate for rain that generates negligible attenuation. The method includes using the bipolar radar to measure the differential phase $\Phi_{DP}$ and the apparent reflectivity $Z_e$ on at least one of horizontal polarization H and vertical polarization V over a given interval $[r_0, r_1]$ of path radii relative to the radar. An estimate of the value $N_o^*$ representative of the dimensional distribution of rain drops is made on the basis of the differential phase difference in the range $r_0$ to $r_1$ and on the basis of an integral of a function of the apparent reflectivity $Z_e$ along the interval $[r_0, r_1]$. A value is deduced for the precipitation rate at a point from $N_o^*$ and the apparent reflectivity at the point.

9 Claims, 2 Drawing Sheets

FOREIGN PATENT DOCUMENTS

WO            WO 99/38028           7/1999

OTHER PUBLICATIONS

"Polarimetric radar modeling of mixtures of precipitation particles", Vivekanandan, J.; Raghavan, R.; Bringi, V.N. Geoscience and Remote Sensing, IEEE Transactions of vol. 31, Issue 5, Sep. 1993 Ps:1017-1030.*

"A Ku-band dual-polarization radar with simultaneous reception", Hanado, H.; Nakamura, K.; Ohsaki, Y.; Horie, H.; Satake, M., IGARSS '93. 'Better Understanding of Earth Environment'., Aug. 18-21, 1993 Ps:85-87 vol. 1.*

"Prediction and comparisons of C-band reflectivity profiles from S-band dual polarization measurements", Direskeneli, H.; Seliga, T.A.; Aydin, K., IGARSS '93. 'Better Understanding of Earth Environment'., Aug. 18-21, 1993 Ps:88 -90 vol. 1.*

* cited by examiner

RADAR RAINFALL ESTIMATION TECHNIQUE WHEN ATTENUATION IS NEGLIGIBLE

This is a nationalization of PCT/FR02/02447 filed Jul. 11, 2002 and published in French.

BACKGROUND OF THE INVENTION

1. Field of the Invention

The present invention relates to meteorological techniques for estimating a precipitation rate by means of radar.

2. Description of the Related Art

When estimating the rate of rainfall from radar measurements, one is generally confronted with the problem of attenuation of the radar wave, and with the problem of the natural variability of rain.

The concept of coherent radar with polarization diversity associated with a so-called ZPHI algorithm is described in WO 99/38028 as a solution for those two obstacles under operational conditions.

ZPHI is a profiler algorithm which basically uses as input a measured reflectivity profile $Z_a$ and a constraint given by a differential phase difference $\Phi_{DP}$ between two points $r_1$ and $r_2$ on a line of sight.

On the basis of those measurements, the specific attenuation A and a parameter known as $N_0^*$ are determined, which parameter quantifies the distribution of raindrop sizes.

The rainfall rate R to be estimated is obtained as a function of those two parameters for two reasons. First, the specific attenuation A is not subject to attenuation effects. Using it to estimate R thus enables the attenuation problem to be overcome. Second, the parameter $N_0^*$ suffices to describe the natural variability of rain.

The ZPHI algorithm is equally applicable in the X and C bands, which frequency bands are sensitive to attenuation.

SUMMARY OF THE INVENTION

The present specification relates to a method extended from the ZPHI method when attenuation is small.

In this particular circumstance, it is possible to specify a formalism that is based on base elements, but that is better adapted and much more direct.

The ZPHI algorithm can also be applied in the S band, where attenuation is small, or indeed negligible. The advantage of so doing lies in reproducing the natural variability of rain "in real time". Use of the parameter A is then no longer strictly necessary.

An object of the invention is thus to propose a method that is simple, reliable, and effective for evaluating a precipitation rate when attenuation is weak or negligible.

For this purpose, the present invention provides a method of using a bipolar radar to estimate a precipitation rate for rain that generates negligible attenuation. The method includes the steps of using the bipolar radar to measure the differential phase $\Phi_{DP}$ and the apparent reflectivity $Z_e$ on at least one of horizontal polarization H and vertical polarization V over a given interval $[r_0, r_1]$ of path radii relative to the radar. An estimate of the value $N_o^*$ representative of the dimensional distribution of rain drops is made on the basis of the differential phase difference in the range $r_0$ to $r_1$ and on the basis of an integral of a function of the apparent reflectivity $Z_e$ along the interval $[r_0, r_1]$. A value is deduced for the precipitation rate at a point from $N_0^*$ and the apparent reflectivity at the point.

The invention also provides an apparatus for estimating a precipitation rate, the apparatus comprising a bipolar radar and processor means, said radar including means for measuring differential phase and reflectivity on at least one of horizontal polarization H and vertical polarization V, the apparatus being characterized in that the processor means implement the various processing steps of the method according to the above paragraph.

Other characteristics, objects, and advantages of the invention appear on reviewing the drawings and reading the following detailed description.

DETAILED DESCRIPTION OF THE PREFERRED EMBODIMENTS

Figure 1:
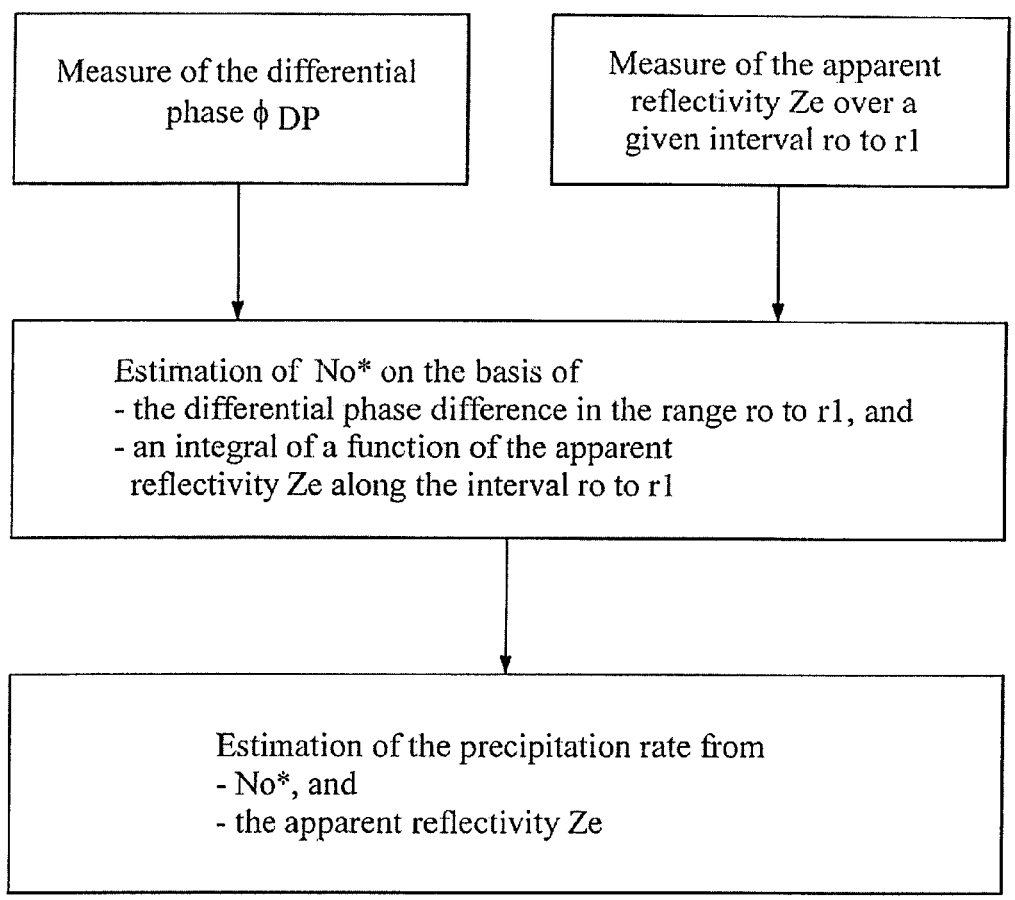
FIG. 1 sets forth the steps of the rainfall estimation method in accordance with the present invention.
Figure 2:
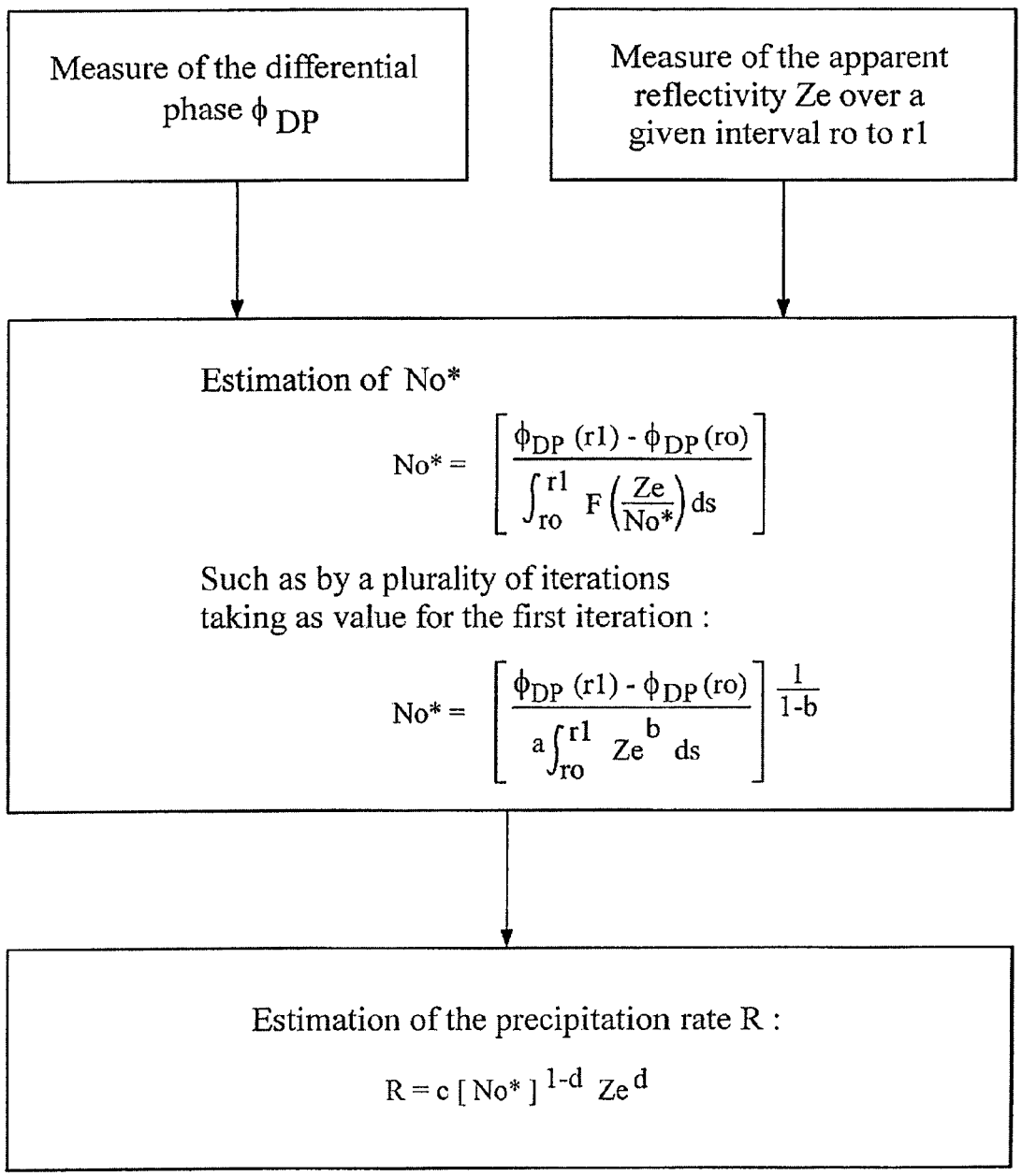
FIG. 2 sets forth steps of the rainfall estimation method in conformity with a specific embodiment of the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

As in the ZPHI method, the method described below requires a coherent polarization diversity radar. The input data are the reflectivity profile $Z_H$ (or $Z_V$), together with a measurement of the differential phase between the H channel and the V channel.

The purpose here is to determine the parameter $N_0^*$ (and thus the rainfall rate) when attenuation is negligible, for example for rain measured in the S band, for rain that is sufficiently light and measured in the C and X bands, or indeed for ice.

As in the ZPHI method, the present method makes use of two types of data: reflectivity $Z_H$ (or $Z_V$, or more generally $Z_e$) and differential phase $\Phi_{DP}$.

Providing attenuation is negligible, the measured reflectivity can be used directly to estimate rainfall rate R on the basis of an estimate for the parameter $N_0^*$ which specifically constitutes the subject matter of the present method.

The method relies on the "universal" relationship associating equivalent reflectivity $Z_e$ (mm$^6$m$^{-3}$) and differential phase rate $K_{DP}$ (° km$^{-1}$):

$$\frac{K_{DP}}{N_0^*} = a \left[ \frac{Z_e}{N_0^*} \right]^b \quad (1)$$

Where a and b are coefficients specified by the diffusion model, and depend on the type of precipitation (rain or ice crystal type) and are also functions of temperature to a small extent. The type of precipitation can be determined by a classification method of the type described by Straka, Zrnié, and Ryzhkov (2000).

More generally, the diffusion model defines the relationship:

$$\frac{K_{DP}}{N_0^*} = F\left[\frac{Z_e}{N_0^*}\right] \quad (2)$$

By integrating (1) or (2) between the two bounds $r_1$ and $r_2$ of the integration segment ($r_1 < r_2$) the following is obtained:

$$\Phi_{DP}(r_2) - \Phi_{DP}(r_1) = [N_0^*]^{1-b} \int_{r_1}^{r_2} Z_e^b ds \quad (3)$$

I.e.:

$$N_0^* = \left[\frac{\Phi_{DP}(r_2) - \Phi_{DP}(r_1)}{a \int_{r_1}^{r_2} Z_e^b ds}\right]^{\frac{1}{1-b}} \quad (4)$$

All that is then required in order to obtain the estimate for R is to feed this estimate for $N_0^*$ into the "universal" relationship associating R with $Z_e$:

$$R = c[N_0^*]^{1-d} Z_e^d \quad (5)$$

In the general case where the relationship $K_{DP}$–$Z_e$ is written in the form (2), (3) becomes:

$$\Phi_{DP}(r_2) - \Phi_{DP}(r_1) = N_0^* \int_{r_1}^{r_2} F\left(\frac{Z_e}{N_0^*}\right) ds \quad (6)$$

An analytic solution is not then available for $N_0^*$, but a numerical solution can be found by an iterative numerical method using solution (4) as the first guess for $N_0^*$.

For ice, which hardly attenuates the radar wave at all regardless of the frequency used (X, C, and S bands), there are no fixed limits on range of application.

For rain, application of the method is constrained by the requirement for attenuation to be negligible between the points $r_1$ and $r_2$ ($r_2 > r_1$). More specifically, application conditions leading to an error of 3 decibels (dB) on $N_0^*$ are as follows (for T=10° C., and for a gamma type relationship having a form parameter equal to 2 governing droplet size distribution):

for X band: $[\Phi_{DP}(r_2) - \Phi_{DP}(r_1)] \leq 4°$
for C band: $[\Phi_{DP}(r_2) - \Phi_{DP}(r_1)] \leq 10°$
for S band: $[\Phi_{DP}(r_2) - \Phi_{DP}(r_1)] \leq 64°$ The main fields of application of the invention include the same fields of application as for the ZPHI algorithm, i.e., estimating rain in catchment areas for flood warning and for water resource management. This application is valid for all types of rain using S band, or to rain that is sufficiently light in C band and X band. The present invention is also applicable to estimating precipitation in the form of ice.

The invention also presents numerous other applications in meteorology.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

What is claimed is:

1. A method of using a bipolar radar to estimate a precipitation rate for rain that generates negligible attenuation, the method comprising the following steps: using said bipolar radar to measure the differential phase $\Phi_{DP}$ and the apparent reflectivity $z_e$ on at least one of horizontal polarization H and vertical polarization V over a given interval $[r_0, r_1]$ of path radii relative to said radar;

making an estimate of the value $N_0^*$ representative of the dimensional distribution of rain drops on the basis of the differential phase difference in the range $r_0$ to $r_1$ and on the basis of an integral of a function of the apparent reflectivity $Z_e$ along the interval $[r_0, r_1]$; and deducing a value for the precipitation rate at a point from $N_0^*$ and the apparent reflectivity at said point.

2. The method according to claim 1, wherein $N_0^*$ is deduced directly from the differential phase difference between $r_0$ and $r_1$ and from the integral of the apparent reflectivity $Z_e$ raised to a selected exponent.

3. The method according to claim 1, wherein the selected exponent is an exponent b satisfying:

$$\frac{K_{DP}}{N_0^*} = a\left[\frac{Z_e}{N_0^*}\right]^b$$

where $K_{DP}$ is the rate of variation in the differential phase along the radius, a and b being specified by the type of precipitation under consideration and by temperature.

4. The method according to claim 3, wherein the type of precipitation is a corresponding type selected from rain type and ice crystal type.

5. The method according to claim 1, wherein the apparent reflectivity function which is integrated depends on $N_0^*$, and further comprising the step of calculating said function in a plurality of iterations using a value for $N_0^*$ as determined at a preceding iteration.

6. The method according to claim 5, wherein $N_0^*$ is calculated from the following relationship:

$$\Phi_{DP}(r_2) - \Phi_{DP}(r_1) = N_0^* \int_{r_1}^{r_2} F\left(\frac{Z_e}{N_0^*}\right) ds$$

where $\Phi_{DP}$ is the differential phase and where F is a function satisfying the following relationship:

$$\frac{K_{DP}}{N_0^*} = F\left(\frac{Z_e}{N_0^*}\right)$$

where $K_{DP}$ is the rate of variation in differential phase along the radius.

7. The method according to claim 5 wherein, for the first iteration, the value used for $N_0^*$ is given by:

$$N_0^* = \left[\frac{\Phi_{DP}(r_2) - \Phi_{DP}(r_1)}{a \int_{r_1}^{r_2} Z_e^b ds}\right]^{\frac{1}{1-b}}$$

8. The method according to claim 1 wherein the rainfall rate R is determined from $N_0^*$ and from the apparent reflectivity $Z_e$ by the relationship:

$$R = c[N_0^*]^{1-d} Z_e^d$$

9. An apparatus for estimating a precipitation rate, comprising a bipolar radar and a processor, said radar configured to measure differential phase and reflectivity on at least one of horizontal polarization H and vertical polarization V, said processor configured to use said bipolar radar to measure the differential phase $\Phi_{DP}$ and the apparent reflectivity $Z_e$ on at least one of horizontal polarization H and vertical polarization V over a given interval $[r_0, r_1]$ of path radii relative to said radar; make an estimate of the value $N_0^*$ representative of the dimensional distribution of rain drops on the basis of the differential phase difference in the range $r_0$ to $r_1$ and on the basis of an integral of a function of the apparent reflectivity $Z_e$ along the interval $[r_0, r_1]$; and deduce a value for the precipitation rate at a point from $N_0^*$ and the apparent reflectivity at said point.

* * * * *